United States Patent [19]

Crawford et al.

[11] Patent Number: 4,715,031

[45] Date of Patent: Dec. 22, 1987

[54] VEHICULAR DATA TRANSFER COMMUNICATION SYSTEM

[75] Inventors: Robert D. Crawford, Plymouth; Wayne J. Johnson, Dearborn Heights, both of Mich.; Theo Kimber, Jr., Huntsville, Ala.; Douglas Nolff, Scio Township, Washtenau County, Mich.; Jack R. Volk; Donald C. Franks, both of Ann Arbor, Mich.

[73] Assignee: Ford Motor Company, Dearborn, Mich.

[21] Appl. No.: 779,200

[22] Filed: Sep. 23, 1985

[51] Int. Cl.$^4$ .............................................. H04J 3/02
[52] U.S. Cl. .................................... 370/85; 340/825.5
[58] Field of Search ........................... 370/85, 89, 94; 340/825.5, 825.51; 375/117, 22

[56] References Cited

U.S. PATENT DOCUMENTS

| | | | |
|---|---|---|---|
| 3,363,059 | 1/1968 | Cummins | 375/117 |
| 3,818,447 | 6/1974 | Craft | 340/147 LP |
| 3,985,962 | 10/1976 | Jones et al. | 179/15 AL |
| 4,063,220 | 12/1977 | Metcalfe et al. | 340/147 LP |
| 4,149,144 | 4/1979 | Diefenderfer | 340/147 R |
| 4,161,786 | 7/1979 | Hopkins et al. | 364/900 |
| 4,234,952 | 11/1980 | Gable et al. | 370/94 |
| 4,271,507 | 6/1981 | Gable et al. | 370/94 |
| 4,425,564 | 1/1984 | Steele | 340/825.79 |
| 4,439,856 | 3/1984 | Ulug | 370/85 |
| 4,482,951 | 11/1984 | Swaney et al. | 364/200 |
| 4,506,360 | 3/1985 | Kryskow, Jr. et al. | 370/85 |
| 4,570,257 | 2/1986 | Olson et al. | 370/94 |
| 4,591,971 | 5/1986 | Darlington et al. | 364/200 |

OTHER PUBLICATIONS

"A Small Area Network for Cars", R. L. Mitchell, SAE Tech. Paper Series No. 840317, 2/84 (Draft).
"Introduction to Communication Systems", F. G. Stremler, Addison Wesley Publ. Co., pp. 364–366.
"The D$^2$B a One Logical Wire Bus for Consumer Applications", C. H. Kaplinsky et al, IEEE Trans. Consumer Elect., vol. CE-27, 2/81, pp. 102–116.
"Serial Bus Structures for Automotive Applications", A. J. Bozzini et al, SAE Tech. Paper Series No. 830536, 2/28/83.
"Standard 3M Recording Techniques Could Spur Low-Cost MC Use", J. A. Kramer, EDN, May 5, 1978, pp. 75–81.
"Pulse Codes in Serial Data Communications", L. S. Sanders, Computer Design, Jan. 1982, pp. 203–210.
"Interface-Line Drivers & Receivers", K. M. True, Fairchild Camera & Instrument Corp., 1975, Chapts. II, III & V.

Primary Examiner—Douglas W. Olms
Attorney, Agent, or Firm—Paul K. Godwin, Jr.; Clifford L. Sadler

[57] ABSTRACT

A data transfer communication system capable of handling both node-to-node data transfer messages originating at any transmitter and transmitted to a specific receiver on the network and functional command messages originating at any transmitter and broadcast transmitted to an unspecified number of receivers on the network. Receivers are programmed to receive and acknowledge receipt of correspondingly addressed node-to-node type messages and certain correspondingly addressed functional command type messages with their unique addresses in a predetermined field location of the transmitted message. By utilizing pulse width modulation techniques, binary logic signals and a unique start signal are defined and have a dominant hierarchy that allows for bit-wise contention of the common data bus. In that manner, when contention of the data bus is resolved a higher priority message continues to be transmitted while losing contender delays its transmission until after the higher priority message is completed.

6 Claims, 21 Drawing Figures

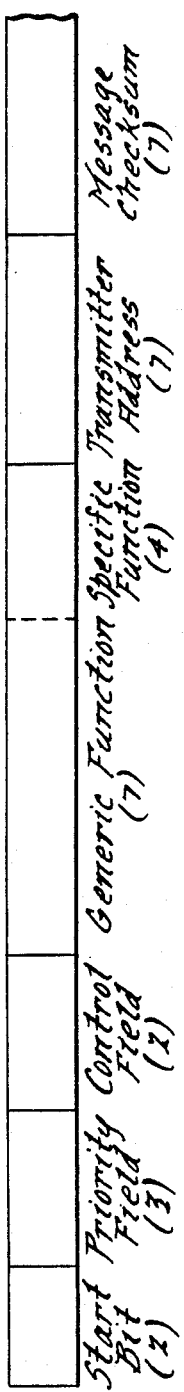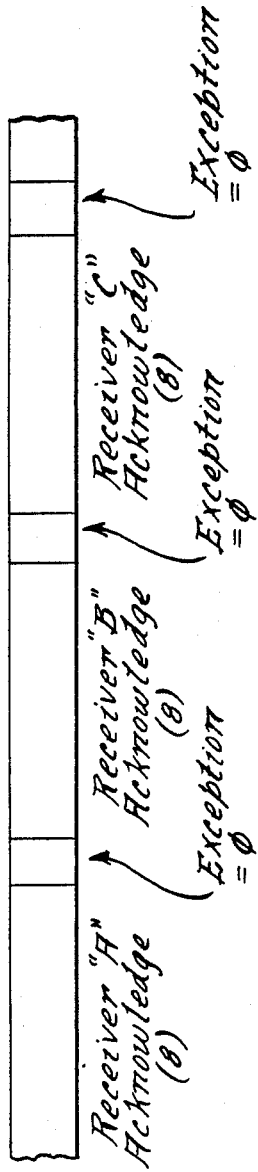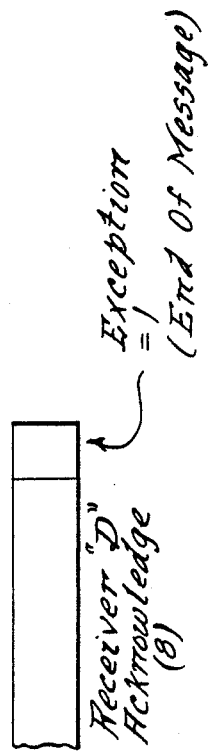
FIG. 4
Function Command With Multiple Receivers Acknowledging

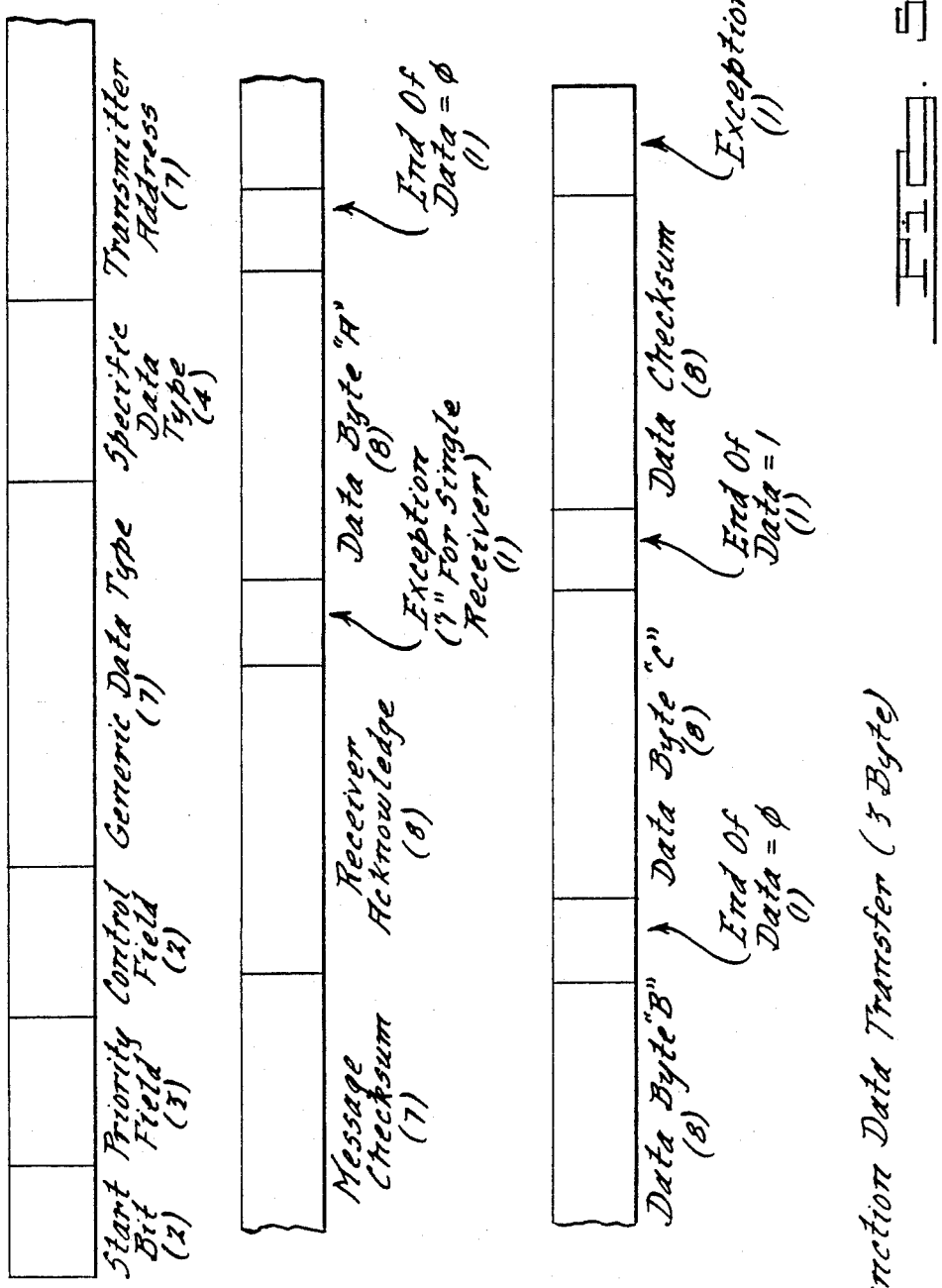

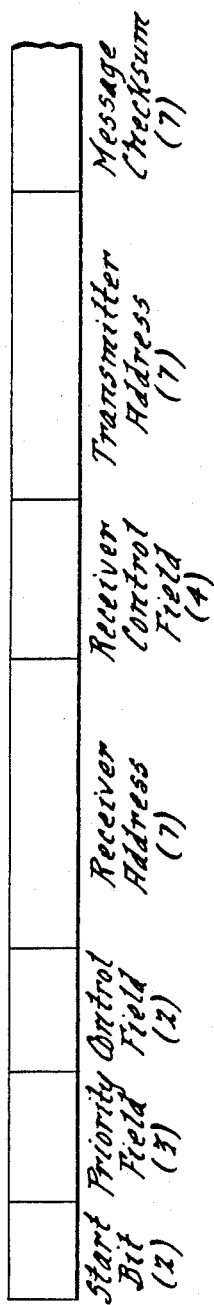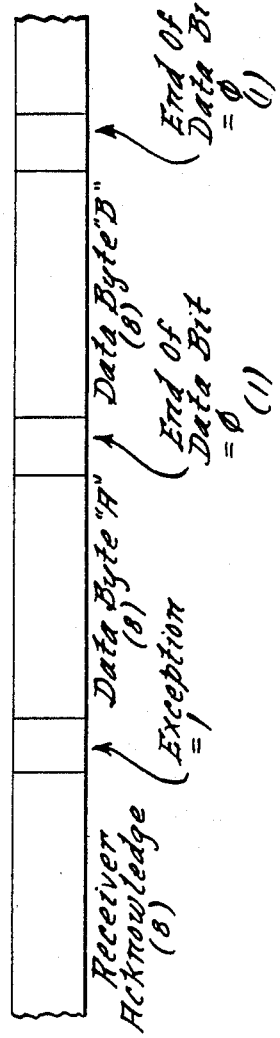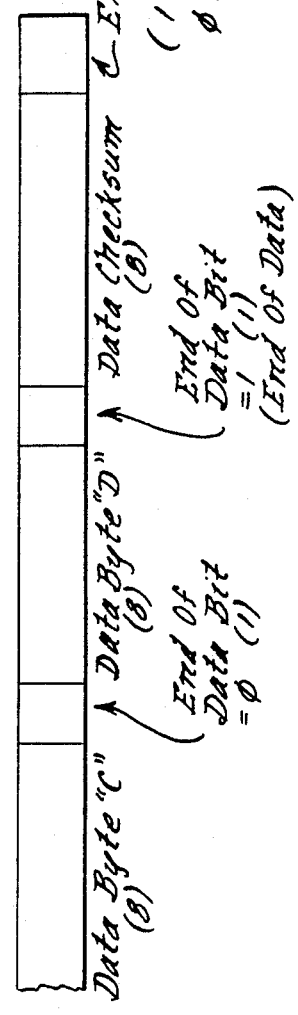
FIG. 11.
Node-To-Node Data Transfer (4 Byte)

Checksum Generation

| Start Bit | Priority Field | Con. Field | Generic Function | Specific Function | Transmitter Address | Message Checksum |
|---|---|---|---|---|---|---|
| | 3 | 2 | 7 | 4 | 7 | 7 |
| | | | (MSN) (LSN) | | (MSN) (LSN) | |

```
              LSN: 0100
              MSN: 0011
                   0101
              LSN: 1000
              MSN: 0001
                   0011
                   _____
                   00110110
```

Process:

1. Individual Fields Are Divided Into 4 Bit Nibbles And Padded With Zeros If Required. (All Fields Are Right-Justified)
2. These Nibbles Are Summed.
3. The Result (7 Bits Long If All Carry Bits Are Counted) Is The Message Checksum.

FIG. 7.

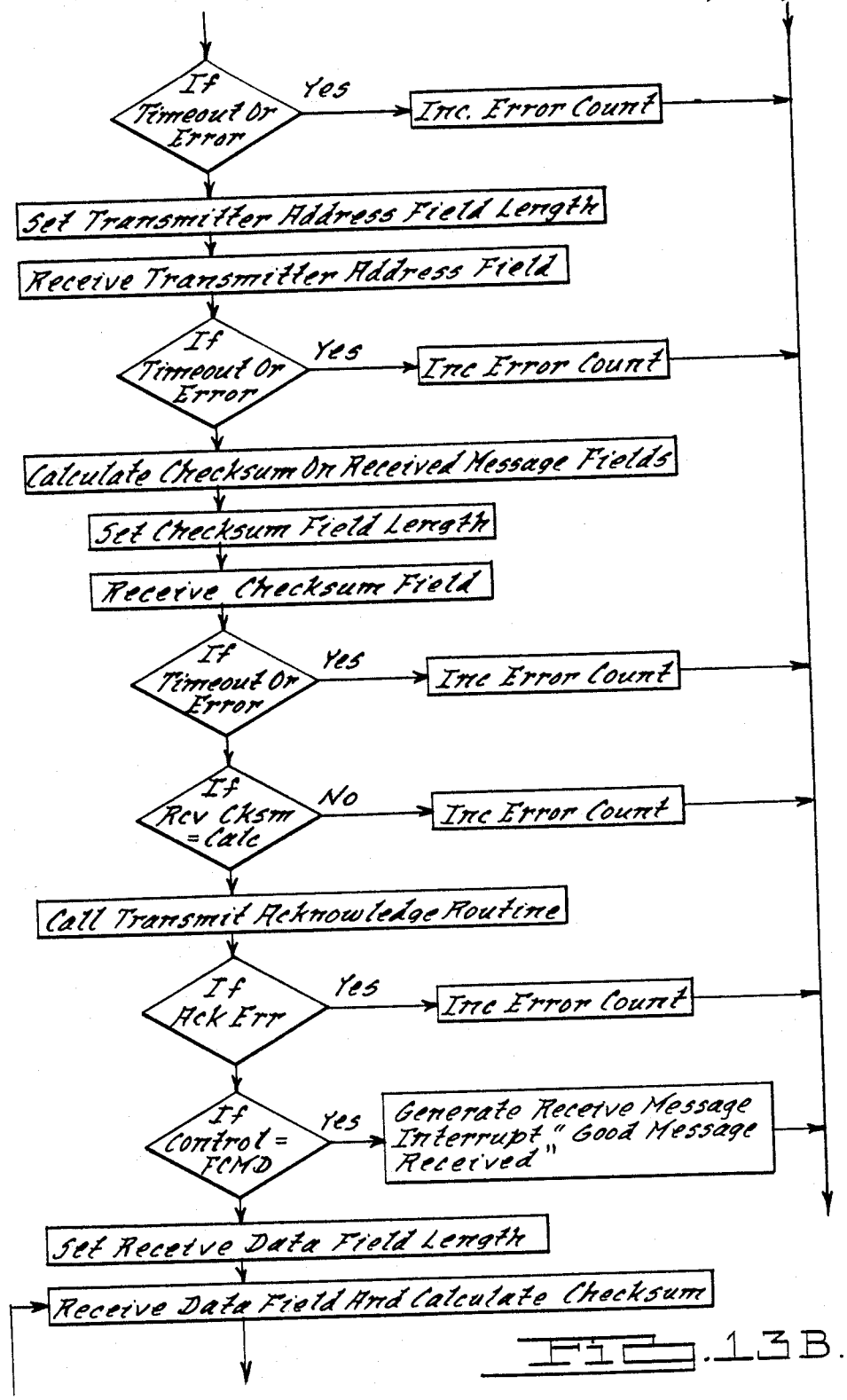

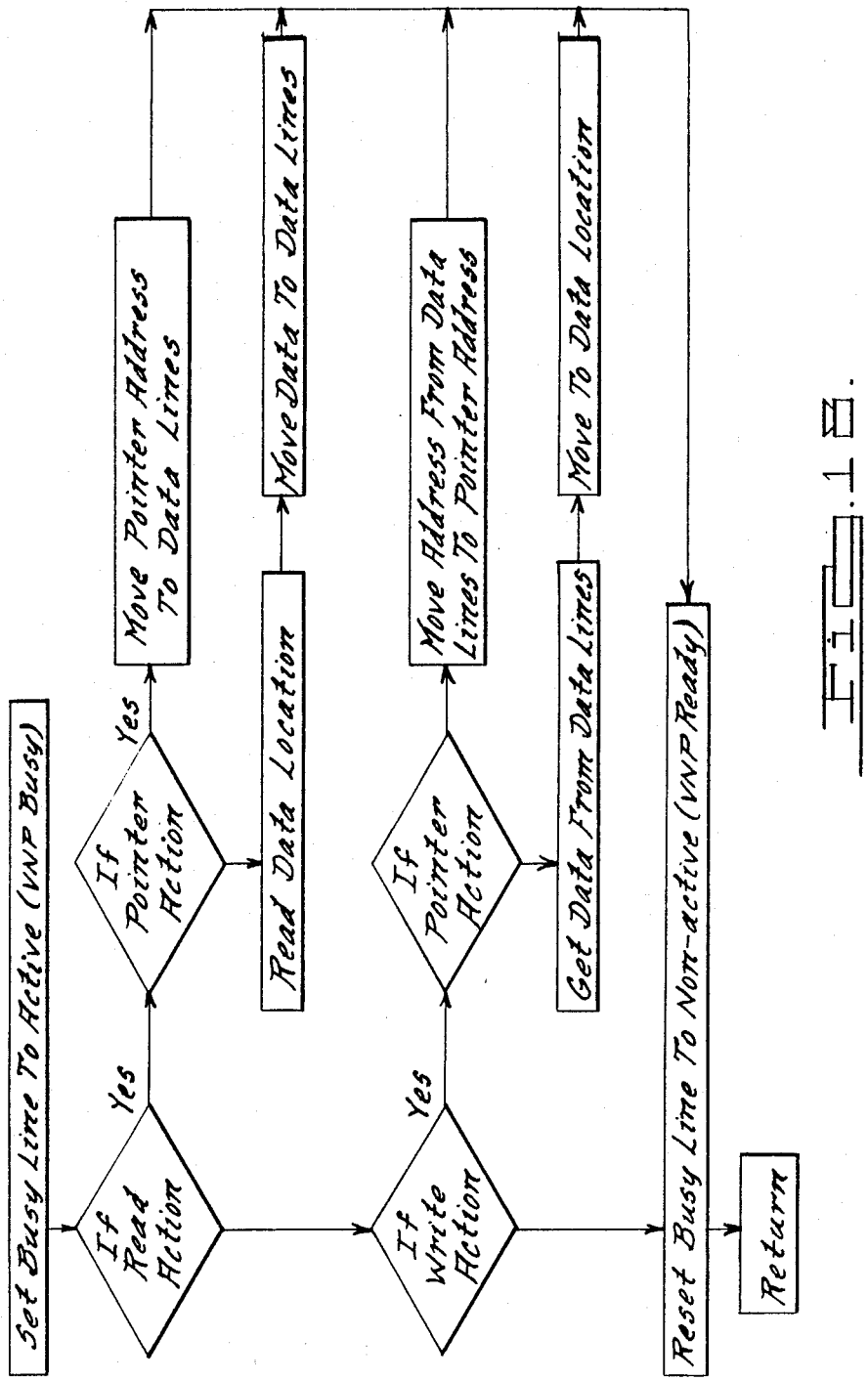

VEHICULAR DATA TRANSFER COMMUNICATION SYSTEM

BACKGROUND OF THE INVENTION

Field of the Invention

The present invention relates to the field of electrical communication networks and more specifically to the area of such networks ideally suited for the control of electrical functions in the vehicular environment.

Description of the Prior Art

Several protocols have been proposed for use in vehicle data communications over the past several years in order to efficiently replace the massive wiring harness that is presently used to provide electrical interconnection of the various switches, sensors, lights, motors, and electronic control modules located throughout the vehicle.

One such protocol proposed in the prior art is based on Time Division Multiplexing (TDM) in which a master timing node is used as a controller to provide a synchronized set of dedicated time slots for which each slave node is obliged to synchronize with and obtain its communication data therefrom. The dedicated time slots in the TDM each provide control information of a prescribed type and those slave nodes which are programmed to perform the prescribed function must be synchronized in such a way so as to extract information from the time slot correspondingly dedicated to that function. Each "receiver" slave node must know exactly when its control function occurs in the data stream. Accordingly, such a system is vulnerable to a failure in the master node since, in such case, the entire network will be unable to communicate.

In addition to the TDM's dependence on the master node operation, TDM systems generally have poor flexibility due to the limited allocation of time slots in the data stream. Accordingly, additions or deletions of types of receivers in a particular network require a reallocation of the time slots through programming of the master control node.

TDM systems also operate on an open loop system in which there is generally no positive acknowledgment that a particular control function has been received. Consequently, TDM system usually provide a continuous update of control data as long as a particular function is being instructed.

Some master/slave network architectures use a polling technique. This is considered an improvement over traditional TDM systems since the master can dynamically reassign time slots. However, all network transactions are dependent on a master node and redundant master nodes are required if the system is to be reliable.

A significant improvement over Time Division Multiplex networks is provided by a Bus Contention (BC) network architecture. A Bus Contention network is characterized by a unified system of nodes, each capable of accessing the network based on its own requirements. There are no "master" nodes, nor any dependence on any particular nodes for network operation.

Instead of the dedicated time slots used in TDM, BC nodes have an "address" by which they are identified. This address uniquely identifies a node to all other parts of the network system. Control messages are directed by the address to the specific node that is responsible for a particular control function.

The BC system has far greater efficiency than TDM systems because network activity is directly related to requests for activation. The bus is not burdened with the constant repetition of control signals which are not active. Messages flow between the nodes, as needed without the intervention of a master controller. Such a method allows for greater adaptability and expandability of the network. New nodes are simply connected to the bus. No reallocation of time slots is required and existing nodes are not affected.

A requirement for the BC type of network architecture is for media access resolution. Because all nodes are capable of network access (i.e., "transmitting") based on their individual needs, a method of resolving conflicts arising from simultaneous transmitter activations is required. Several different solutions are in widespread use for Local Area Network (LAN) applications. CSMA/CD (Carrier Sense Multiple Access with Collision Detection) and Token Passing schemes are most common. These, however, are optimized for physically (and electrically) large networks where message propagation delay between nodes is large. Collisions often are not detected until both transmitters are well into their individual message sequences. An "abort and retry" scheme is used to resolve the conflict, whereby, both messages are aborted and both transmitters must make attempts to retransmit at a later time.

A different and more efficient method of message collision resolution has been found to be suitable for small networks. It is called the "bit-wise contention resolution" technique. An example is the Philips/Signetics $D^2B$ network protocol as disclosed in "The $D^2B$ a One Logical Wire Bus for Consumer Applications", by C. H. Kaplinsky, et al., IEEE Transactions on Comsumer Electronics, Vol. CE-27, February 1981, pg. 102-116; "Serial Bus Structures for Automotive Applications", by A. J. Bozzini, et al., SAE Technical Paper Series No. 830536, February 28, 1983; and "A Small Area Network for Cars", by R. L. Mitchell, SAE Technical Paper Series No. 840317, February 1984.

The $D^2B$ method relies on small network propagation delays, being much less than a single bit period. For a given size network, this places an upper bound on the potential frequency response or bit rate of the network. Because the network "looks" small electrically, each bit of a message exists at all points on the network simultaneously. Each transmitter, therefore, is aware of network activity on a bit-by-bit basis in real time. This allows a technique of message arbitration which resolves conflicts "on the fly". Messages are not destroyed in the arbitration process; rather, the network "sees" one of the conflicting messages as being valid. The losing transmitter detects this and tries again as soon as the first message has passed.

The general BC network architecture described above, where each node has a unique address, is characterized by messages which have specific transmit origins and receive destinations. These "node-to-node" messages contain specific references to the physical address of both the transmitter and receiver, along with a data field which contains an encoded description of a particular activity to take place. While BC network configurations are a significant improvement over TDM systems, there are still aspects of network operations unique to automotive requirements which are not completely addressed by the node-to-node schemes.

SUMMARY OF THE INVENTION

The present invention is directed to a data transfer communication system that is ideally suited to a vehicle in which numerous receiver/transmitter control modules are located at various nodes (control points) throughout the vehicle. The control modules are interconnected via a common data bus so that they may receive functional or informational data from the data bus and in turn, transmit acknowledgments, or when necessary transmit instrucions of informational data designated for one or more other control modules connected to the data bus.

The protocol employed by the present invention allows each node to be treated as equal participants on the network since there are no specific transmitters, receivers, or timing masters. In this system, all nodes are capable of receiving and initiating commands, and informational data transfers on either a node-to-node basis or a global network transmission basis.

The present invention utilizes a distributed control environment whereby any control module programmed as having the ability to make global (broadcast) transmission of functional commands across the network may do so and other control modules that are programmed to receive such functional commands receive, acknowledge and act on the transmitted functional commands.

In the present invention, each function or data message includes an independent priority field wherein each type of message that is allowed to be transmitted is identified according to a predetermined priority hierarchy for bus access. The priority field guarantees network access in less than one message period for high priority messages. High priority functions on an automotive vehicle may be, for example, a functional command from the control module monitoring brake pedal to the control modules which are preprogrammed to respond to "brake light on" functional commands and turn on the brake lights. Typically, lesser but also high priority function commands would involve the switching on of headlamps, the dimming of high beam headlamps, the actuation of door locks and the actuation of a horn.

The present invention increases the message transmission/reception reliability by providing for a fully acknowledged communication protocol. In this system, each message period includes a positive acknowledgment portion through which each receiving control module will provide its unique address on the data bus. In this way, a systemwide handshaking technique gives positive indication to the transmitting module that the message was received and the identity of each receiver.

Each message sent on the system is also protected by a message-wide checksum for error detection. The checksum is transmitted as part of the message and receiver acknowledgments are only made after the checksums accumulated by the receiver and in the received message are compared and found to correspond. The receiver acknowledgments are protected by a parity bit to force the receiver address to a predetermined odd or even sum.

Message contention on the network bus is handled on a bit-wise contention basis. Therefore, for every collision of messages on the network, the one with the highest priority will win and continue to be transmitted. No bus time is lost due to collisions, because each message type is arbitrated on a bit-by-bit basis for each bit transmitted on the bus and the dominant bit prevails. This way, a valid message will be transmitted while the lower priority message is inhibited from further transmission. The losing transmitter simply waits until the higher priority message is finished before attempting to transmit. Therefore, the present invention allows for 100% bus utilization during high traffic periods.

BRIEF DESCRIPTION OF THE DRAWINGS

FIG. 4 illustrates the function command message format with multiple receivers acknowledging as employed in the present invention.

FIG. 5 illustrates a function data transfer message format, as employed in the present invention.

FIG. 6 illustrates a node-to-node data transfer message format, as employed in the present invention.

FIG. 7 exemplifies the method of providing checksum generation for each message.

FIG. 13A-13C provide a flow diagram of a control processor receive message routine.

FIG. 18 is a flow diagram of a control processor node communication routine.

DETAILED DESCRIPTION OF THE PREFERRED EMBODIMENT

Figure 1:
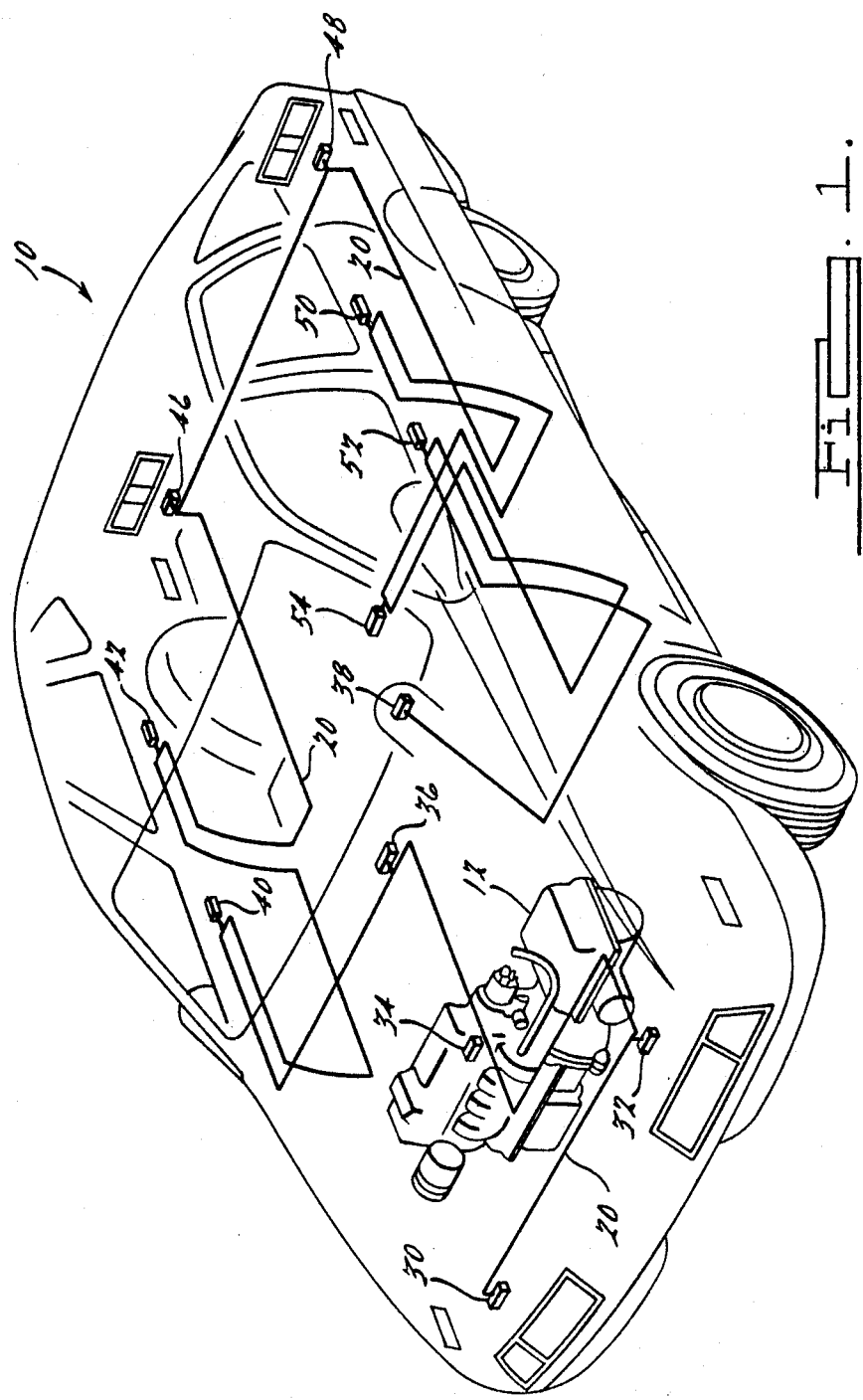
FIG. 1 is a conceptual drawing of the present invention as intended for a typical installation in an automotive vehicle.

The present invention is viewed as being ideally suited for installation in an automotive vehicle, such as that shown in FIG. 1. In the vehicle 10, an engine 12 is shown in order to give perspective to the overall layout of the vehicle with respect to the present invention. The data communication system is shown as utilizing a single data bus communication link 20 that is routed to various control modules around the vehicle. In this instance, a twisted wire medium is used as the data bus 20. However, it is foreseen that other transmission mediums such as fiber optics, acoustical carriers or coaxial cables may be substituted.

In FIG. 1, a control module 30 is illustrated as being located at the forward right corner of the vehicle. The control module 30 is intended to receive functional commands and control the operation of headlamps, parking lamps, highbeams, turn signals, warning flasher lamps and a horn located in that general area of the vehicle. Correspondingly, a control module 32 in the forwrad left portion of the vehicle functions in a manner similar to control module 30 to provide control of the various lamps at that location. Control module 34 resides on or close to the engine 12 so as to provide information from such engine mounted sensors as oil level, water temperature and engine speed to the data bus for transmission to other control modules connected thereto. Control module 36 is located in the area of the instrument panel of the vehicle 10 in order to control instrument lighting and provide appropriate information to instruments thereon regarding the various sensed operational parameters within the vehicle. Control module 38 is shown connected to the steering column of the vehicle 10 and is intended to have inputs from various associated switches to control many of the functions which take place in the vehicle. For instance, headlights, parking lights, turn signals and horn actuation would most likely be controlled by switches connected to the control module 38. A brake pedal sensor switch may be connected to either control module 36 or 38 depending upon the vehicle configuration. Control modules 40, 42, 50 and 52 are shown as located in the doors of the vehicle 10 to provide interconnection to the various window raising and lowering motors, the door lock actuators, door open/close sensor switches, convenience lighting and in the case of the control modules 40 and 52 on the front doors, power seat control switches. The control module 54 is shown as being located central to the vehicle, preferably under the front seats of the vehicle in order to supply control information to the seat adjustment motors and seatbelt connection sensors. Control modules 46 and 48 are shown as located in opposite corners at the rear of vehicle 10 in order to control the functional operation of the various lamps located at the rear of the vehicle including stop lights, back up lights, running lights, turn signals, emergency flashers and to provide fuel level sensor information to the data bus.

While the above described functions are exemplary of those capable of being handled by the communication system of the present invention, it should be seen that the system is flexible enough to accommodate additional control modules or added functions to present modules, including diagnostic capabilities without reprogramming the unaffected control modules.

The following discussion concerns the protocol employed by the present invention and illustrates the unique flexibility to accommodate such modifications.

Figure 2:
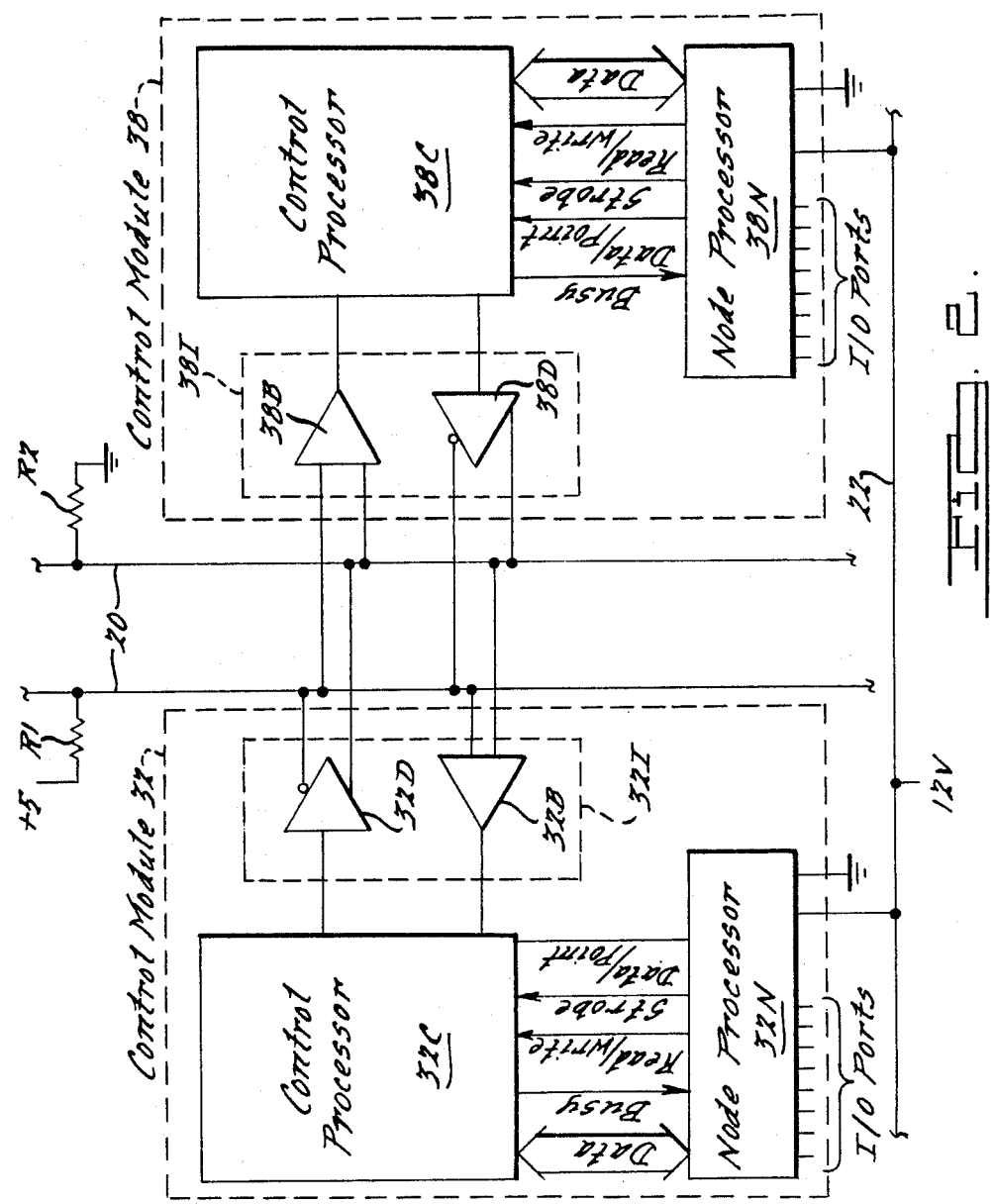
FIG. 2 is a more detailed diagram of a pair of accessory control modules connected to the data bus shown in FIG. 1.

FIG. 2 is an example of a relationship of two control modules 32 and 38 connected to the data bus 20. In addition, each control module is connected to a power bus 22. (Although the power bus 22 is not shown in FIG. 1, it is understood that the power bus 22 would run throughout the vehicle to supply the necessary electrical power to the various accessories that are controlled by the control modules.)

In this embodiment, each wire of the data bus 20 is biased to separate passive levels. A first wire is biased through a resister R1 to a regulated voltage supply of approximately 5 volts. The other wire of the data bus 20 is biased through a resister R2 to ground. Therefore, in the passive state, one wire is at approximately 5 volts DC and the other wire at ground potential. Accordingly, when a logic bit signal is placed on the data bus, and the data bus is energized to its dominate state for a period of time, the normally 5 volt biased line will be driven to approximately ground potential and the normally zero biased line will be driven to approximately a 5 volt level. This technique allows for increased reliability of signal transmission and reception via differential drivers and receivers.

In the configuration shown in FIG. 2, each control module contains an interface circuit 32I (38I) which includes a differential driver 32O (38D) and a differential receiver 32B (38B). Each control module includes a control processor 32C (38C) and node processor.

The present embodiment of the invention utilizes Intel 8751 microcomputers for respective control and node processors. Of course the control processor, as described above, controls the network communication tasks while the node processor controls the local tasks or functions. While the control microprocessors on the network all utilize identical programming to accomplish the network control task, each contains a unique address to identify that particular control module and unique function codes stored in its memory that correspond to the particular functions handled by its associated node processor. The control procesor, besides communicating with the network through the interface circuit, also communicates through a parallel interface with the node processor.

The node processor interfaces with various devices in an area of its physical location through its various I/O ports to provide appropriate interconnection to the power bus 22. Resident software in each node processor gives the particular processor a specific "personality" since each node processor controls or responds to different elements in the vehicle.

Architecturally, the control processor appears to the node processor as a series of read/write registers which contain various status and data information. The node processor initializes and performs network transmissions by writing information to those registers and receives messages by reading other registers. All register read/write operations take place over a parallel data bus interconnecting the two processors. The process for reading and writing those registers is coordinated by the four control lines designated as "data/pointer". "read/write", "strobe" and "busy". All but the busy line are inputs to the control processor. The busy line is used to indicate that the control processor is occupied performing some task relative to the node processor interface. In order to achieve a message transmission between the control and node processors, the control processor receives through the parallel interface to the node processor, information, in byte form, to be formed into the protocol for transmission on the data bus 20. The control processor is also responsible for recognition and decoding of formatted messages from the bus.

The basic unit of communication in the network protocol of the present invention is the message format. Each message is intended to be from 40 to 121 bits long, depending on the message type. For a five kilohertz bit clock rate, the message period requires from 8 milliseconds to 24.2 milliseconds, depending upon the message length. Typical message periods are approximately 10 milliseconds long, resulting in a 100 message per second network capacity. Of course, utilizing a higher bit clock rate would increase the message capacity of the network.

The present invention uses two general types of messages. First, a node-to-node type message is designated with a specific transmitter and receiver address contained in the message. A second general type of message is a functional message which is intended for global broadcast distribution on the network. A first type of functional message is termed herein as a "functional command" message, where the entire message is transmitted and acknowledged as received by one or more other control modules programmed to receive the particular function command contained in the message. A second type of functional message is termed herein as a "functional data transfer" message which is an expansion of the functional command message to include informational data following the receiver acknowledgment portion for global distribution on the network.

Figure 3:
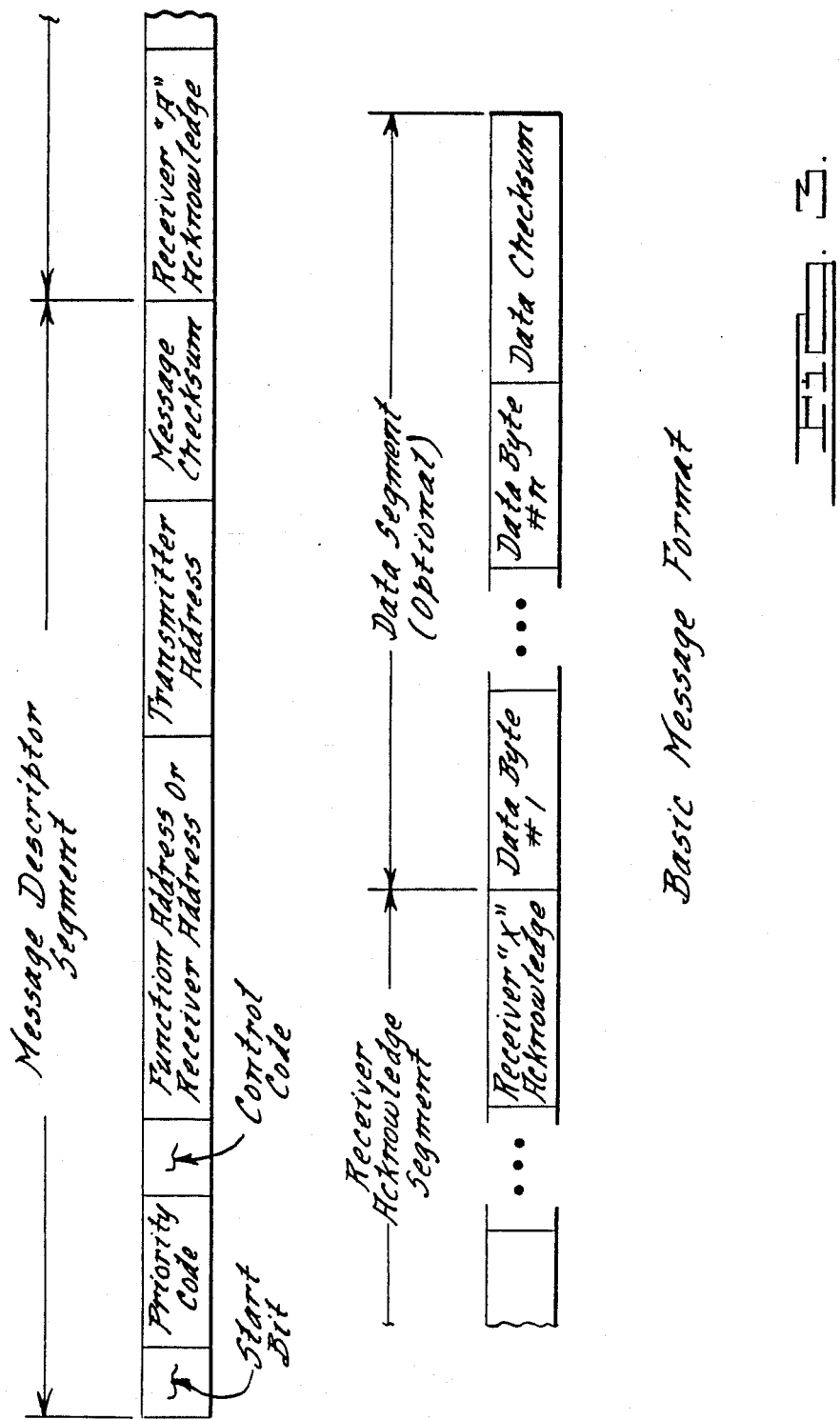
FIG. 3 illustrates the basic message format.

FIG. 3 illustrates the basic message format as employed in the present invention. The basic format contains a message descriptor segment and a receiver acknowledgment segment. A data segment may also be provided in certain types of messages (node-to-node and functional data transfer). In the message descriptor segment, a unique start bit is first provided followed by a priority code. The priority code is utilized for message arbitration on a bitwise basis and will be discussed below with respect to FIG. 11. Following the priority code, is a type control code that indicates which of the two general types of messages is being transmitted. The following field contains either a function address as is employed in the broadcast functional messages or a specific receiver address in the event the message is a type intended for node-to-node communication. The following field contains the transmitter address followed by a message checksum field.

The receiver acknowledgment segment of the basic message format shown in FIG. 3 is either variable in length, when the message type is a broadcast functional type message so as to accommodate any number of receivers attempting to acknowledge receipt of the message, or of a fixed length, if the transmitted message is a node-to-node type message to accommodate the acknowledgment by one particular receiver of its unique address.

The data segment follows the receiver acknowledgment segment in the event the message is a node-to-node type or a functional information type and includes a string of data up to a predetermined limit.

The present invention has the advantage of providing global network messages that can replace several node-to-node messages. On the other hand, where node-to-node messages need to carry sensor information such as engine speed, vehicle speed or temperature to a specific control module, such messages are also accommodated. In the case of a message for turning on or off emergency flashers on a vehicle, it is seen as most efficient to provide a functional command that is broadcast to all of the control modules. Only those control modules connected to the lamps which serve as emergency flashers will, of course, respond to the functional command message on a single transmission of the message. Such an accommodation eliminates the necessity to broadcast four separate node-to-node messages to control the four separately located and controlled flasher lamps.

In order to provide a secure system, acknowledgment must be accommodated. Since there is an unspecified number of receivers that will receive and respond to a particular functional type message, the present system provides for a variable period in the receiver acknowledgment segment of each message.

The function command message format is shown in FIG. 4 as including the unique start signal occupying a two bit field. A three bit field for the priority signal follows the start signal and a two bit field for the control signal follows the priority signal. The control signal will indicate a function command type message being transmitted. The following eleven bit field contains a generic function address in the first seven bits and a specific function address in the remaining four bits. A generic function might appear as "headlamps" while the specific function may appear as "on" or "off". Another generic function command may appear as "door locks" while the associated specific function may appear as "lock" or "unlock". Following the function command, a seven bit field conveys the transmitting control module's unique address while the immediately succeeding seven bit field includes the message checksum of the message. Following the end of the message checksum, the transmitting control module reverts to its receiver mode of operation to await acknowledgments by receiving control modules that are programmed to respond to the function command contained in the message. A receiver having the highest priority unique address will prevail as the first to acknowledge and, following the appropriate protocol, any other receiver that lost out in accessing the bus to transmit its acknowledgment address will change the exception bit from a passive state to a dominant state and contend for the bus to transmit its unique address as an acknowledgment. Such acknowledgment continues until all receivers of the function command have acknowledged receipt and the exception bit is left at its passive state for one bit length. At the end of the exception bit being left in a passive state for one bit length, any other control module having a message to be sent may attempt to access the bus by providing a start bit and contending for the transmission of its complete message.

The function data transfer type message shown in FIG. 5 is very similar to the function command message format shown in FIG. 4 except that after the receiver acknowledgment segment of the message period is utilized, the transmitting control module reverts back to its transmitting mode of operation and transmits data in eight bit bytes. An end of data signal is followed by a data checksum signal occupying eight bits.

The node-to-node data transfer message format is shown in FIG. 6 and differs from the function data transfer message shown in FIG. 5 by providing a different type signal code in the two bit control field and a specific receiver address in the seven bit field following the control field. The node-to-node data transfer message provides for a single receiver acknowledge field in the acknowledge segment followed by a number of data byte fields of eight bits each in the data segment.

A typical need for a node-to-node type message may occur where a control module 52 is connected through its associated node processor to a set of power window control switches and the switch assigned to command the movement of the right front window is actuated. In such a case the message would be sent specifically to control module 40 which is associated with the right front window motor. In that instance, the control field would indicate a node-to-node type message is being sent, the unique address of the control module 40 would occupy the receiver field and the data field would contain instructions to move the specific window up or down.

The checksum generation method is shown in FIG. 7 wherein the binary values of the priority field, the control field, the function fields and the transmitter address fields are summed to provide a unique binary number which is included by the transmitting control module in the message checksum field. Accordingly, a receiving control module can compare the transmitted message checksum received with the binary signals it has accumulated to determine whether or not the received message corresponds to the message transmitted.

Figure 8:
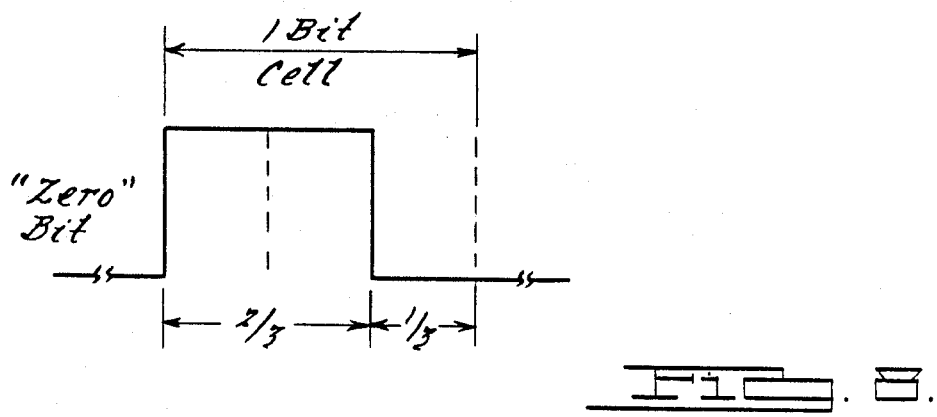
FIG. 8 is a waveform diagram illustrating a "zero" bit signal.

The signals transmitted on the data bus utilize a pulse width modulation technique to represent binary logic states as well as a unique start signal. The bit cell time period is subdivided into three subbit-time periods. As shown in FIG. 8, a "zero" (0) bit binary logic state is respresented when the data bus 20 is placed in its dominant state for the first two subbit-timed periods and in its passive state for the last subbit-time period.

Figure 9:
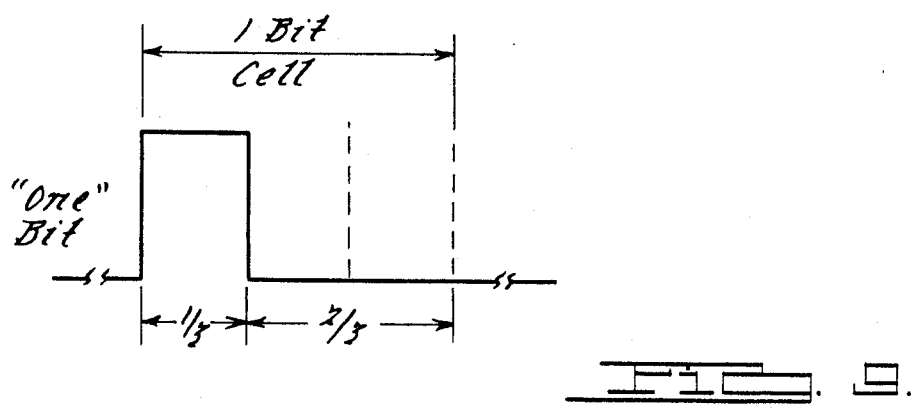
FIG. 9 is a waveform diagram illustrating a "one" bit signal.

In FIG. 9, a "one" (1) bit binary logic state is illustrated, whereby the data bus is energized to its dominant state for the first one-third of the bit cell time period and allowed to resume its passive state for the remaining two subbit-time periods.

In this embodiment, the 0 logic bit transmission is dominant over the 1 logic bit transmission on the bus due to the fact the second subbit-time period is energized during a 0 logic bit transmission while that same second subbit-time period of a 1 logic bit transmission should have allowed the bus to return to its passive state.

Figure 10:
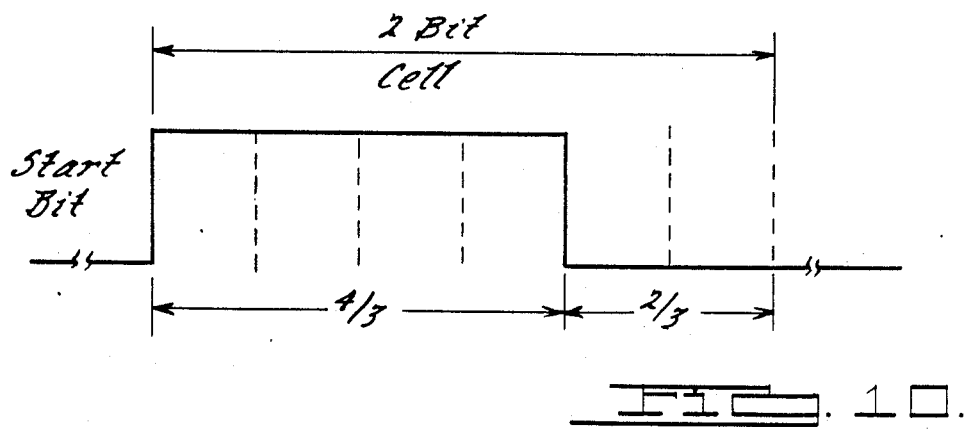
FIG. 10 is a waveform diagram illustrating a "start" bit signal.

FIG. 10 illustrates the unique start signal that occupies two bit cells represented by the bus being energized to its dominant state for the first four subbit-time periods while the remaining two subbit-time periods allow the bus to return to its passive state. An alternative method of providing a start signal would be to energize the bus to its dominant state for the first five subbit-time periods followed by one subbit-time period with the bus in its passive state.

Figure 11:
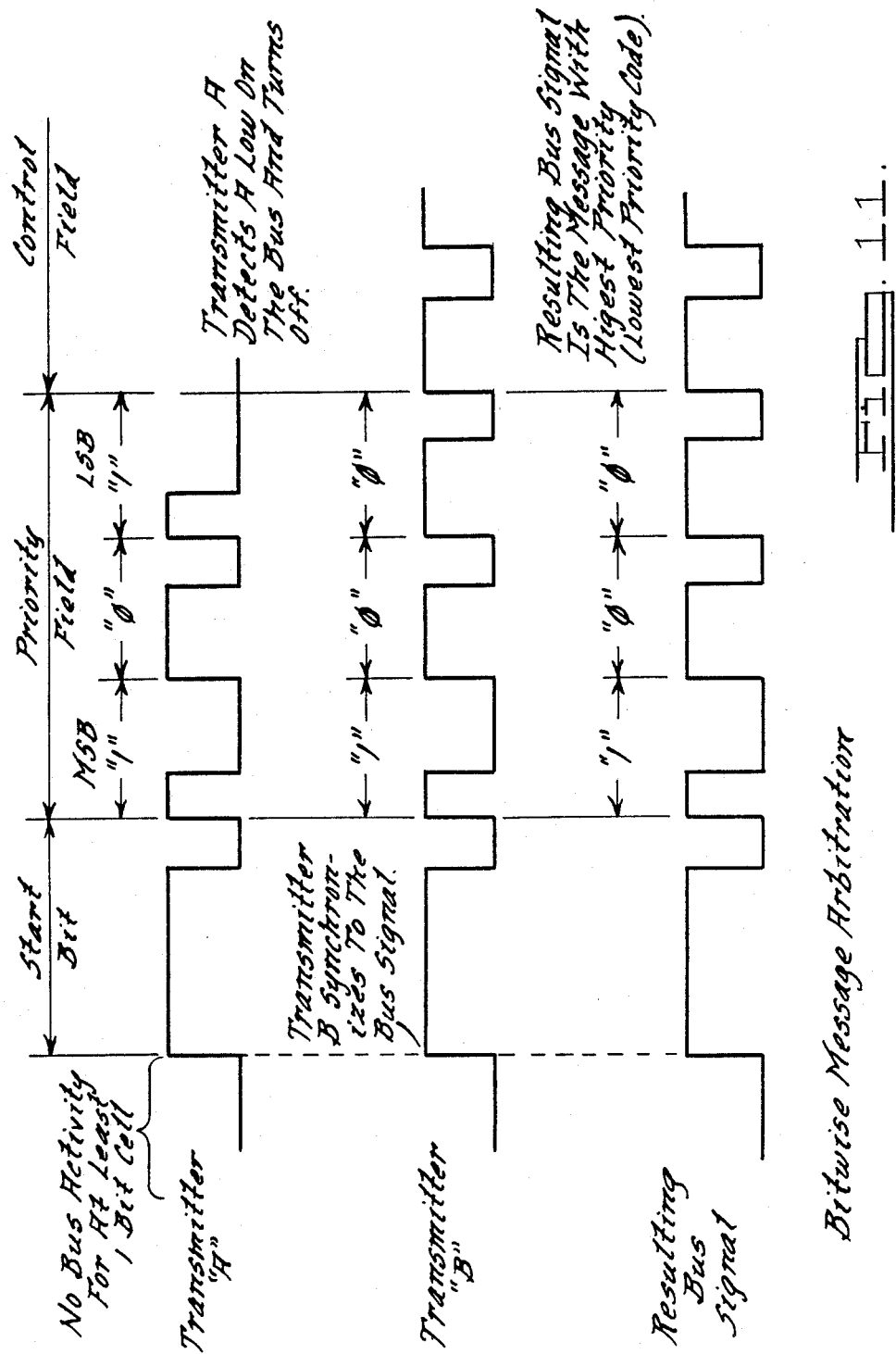
FIG. 11 illustrates the bitwise message arbitration as it occurs in the present invention.

Utilizing the pulse width modulation technique of conveying binary bit signals on the data bus, the bitwise message arbitration technique that occurs in the present invention is shown in FIG. 11. In that FIG. 11, a transmitter "A" and a transmitter "B" have attempted to transmit respective messages at approximately the same time on the data bus following a period of at least one bit cell of no bus activity. In FIG. 11, it is assumed the transmitter A is the first to apply a start bit to the data bus. However, since transmitter B synchronizes to the leading edge of each signal placed in the data bus, its start bit will occur at approximately the same time and its synchronization will cause the rest of the B start bit and subsequent bits to coincide with those transmitted by transmitter A. The resulting signal on the bus appears as a valid start bit and all other control modules connected to the data bus recognize the start bit and are automatically synchronized to the leading edge.

In the example shown in FIG. 11, the most significant bit in the three bit priority field of the messages transmitted by both transmitter A and transmitter B are each at a 1 logic state and therefore, the resulting logic bit signal on the bus is a 1. The second bit within the priority field is at a 0 logic state in the case of both transmitter A and transmitter B. The resulting logic bit signal on the bus is a 0. However, in the least significant bit portion of the priority field, the transmitter A attempts to provide a 1 logic state signal to the data bus while the transmitter B provides a 0 logic state signal thereto. Since the 0 logic state signal in this embodiment dominates the 1 logic state signal, the resulting logic bit signal on the data bus will appear as a 0. Accordingly, since the transmitter A detects a bit signal which is different than that it formatted for transmission, transmitter A inhibits further transmission of its signal and transmitter B continues to transmit its message on the data bus.

With respect to the issue of priority, a predetermined hierarchy must be established so that messages formatted for transmission will have a known priority. For instance, on a scale of 0 to 7, brake light commands would have the highest priority. Safety related signals, such as trunk ajar or door ajar signals, have the next level of priority. Subsequent order of priority in decreasing value would be the human initiated control signals, such as headlamp control, door lock controls, followed by sensor data information including fuel tank levels, ambient air temperature, speed, etc.

In the event two transmitters provide the same priority message at the same time to the data bus, the bitwise arbitration method employed herein, will continue arbitration through the entire message field and will be resolved as soon as one of the transmitters provides a dominant signal different than the other. In the case of duplicate priority transmissions with duplicate functions, the arbitration will have occurred in the transmitter address portion since each transmitter has a different unique address.

Figure 12:
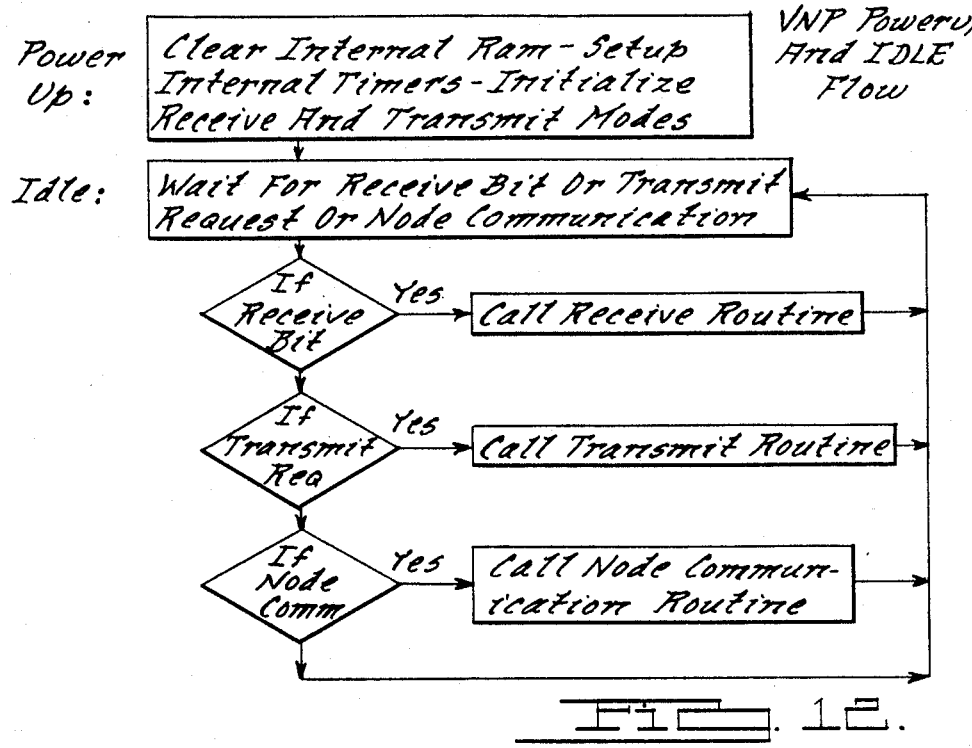
FIG. 12 is a flow diagram of a control processor in its power-up and idle state.
Figure 17:
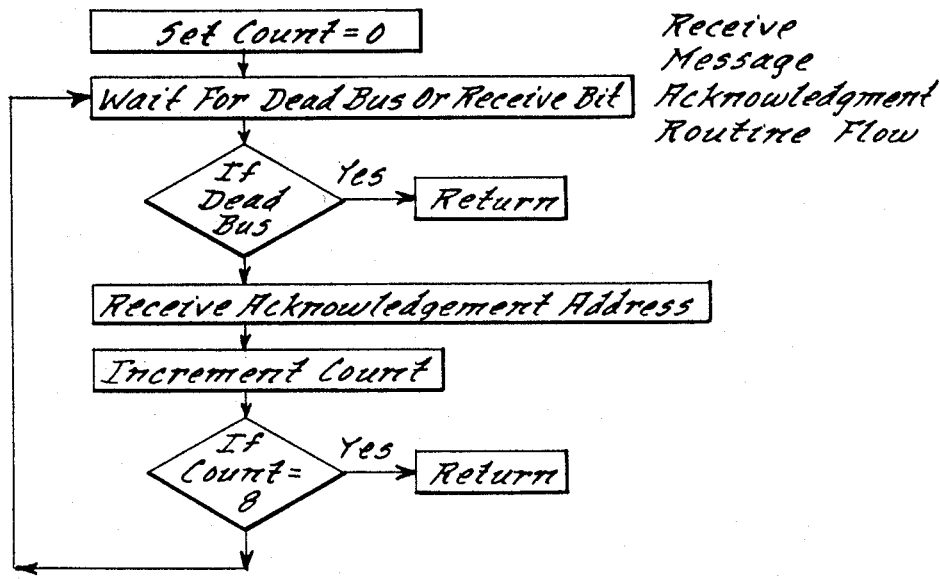
FIG. 17 is a flow diagram of a control processor receive message acknowledgment routine.
Figure 13A:
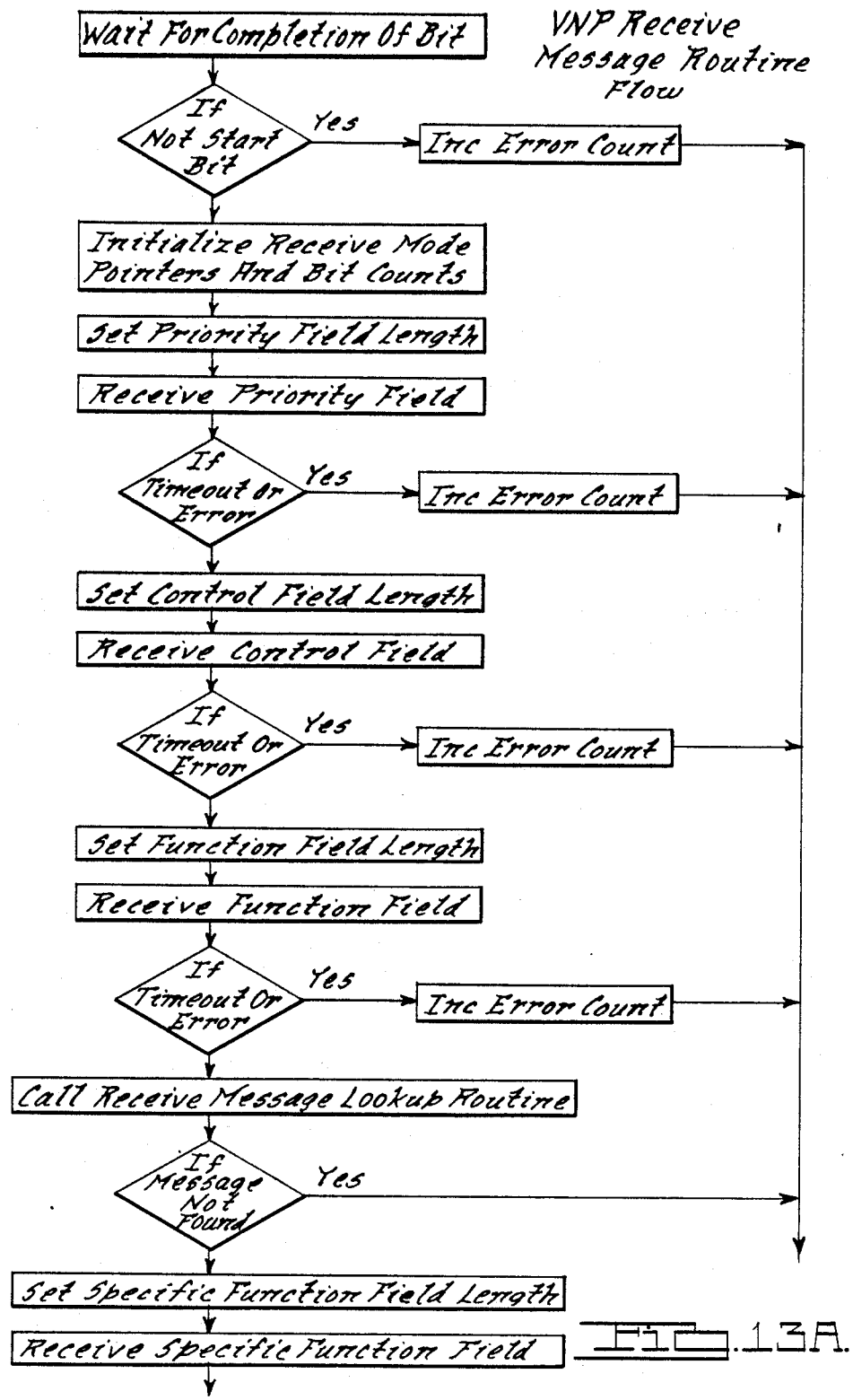
Figure 13C:
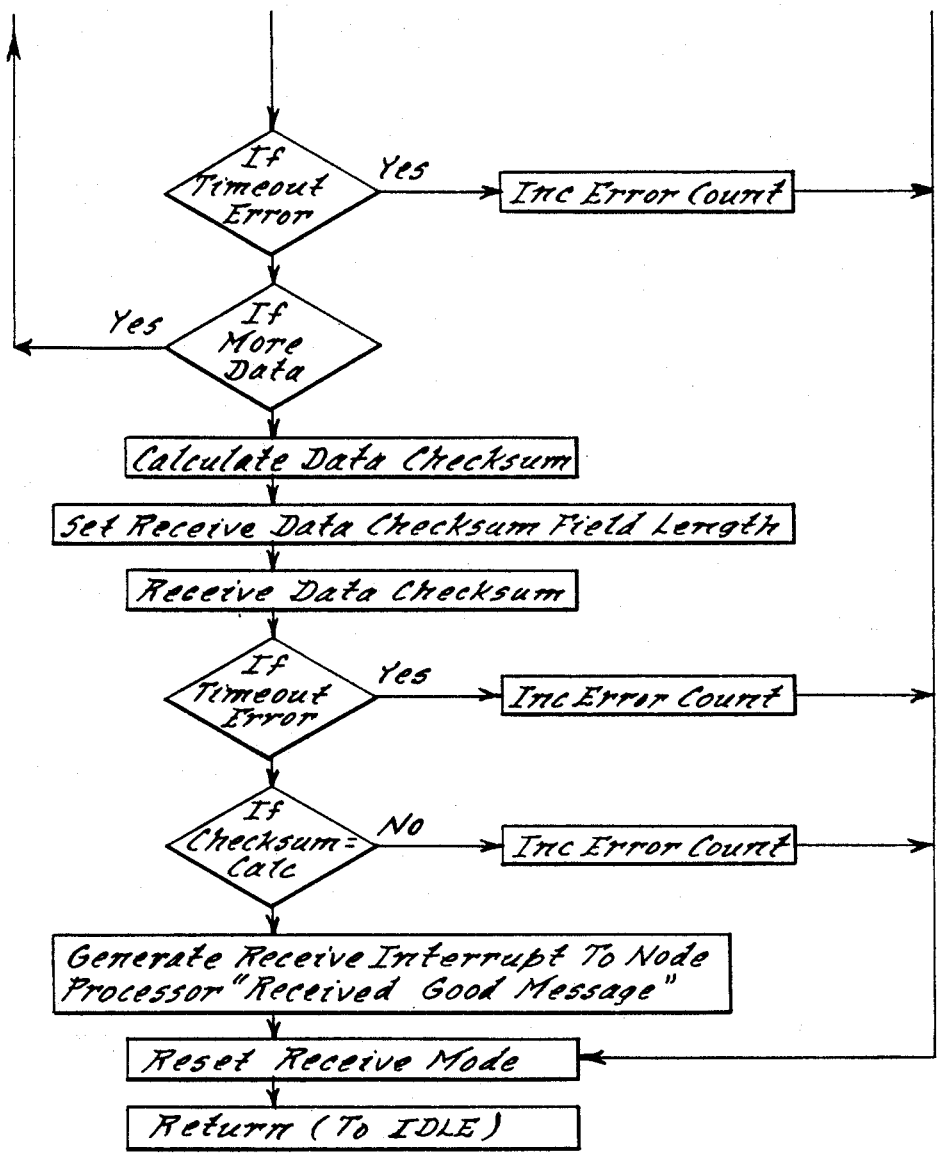

The flow diagram illustrating the operation of the control processors used to receive and transmit information throughout the network is provided in FIGS. 12-18. In FIG. 12, the power up and idle flow diagram is presented. Upon power up, the internal registers of the random access memories (rams) are cleared and all timers and message registers are initialized. The processor then waits for either a communication from its associated node processor to begin formatting and transmitting a message onto the data bus 20 or waits for a recognizable start bit to be provided from the data bus 20. If a start bit is received on the data bus 20, the control processor enters its receive routine as is described in FIGS. 13A-13C. If the control processor receives a transmit request from its local node processor, it enters its transmit routine which is described in FIGS. 16A and 16B. On the other hand, if the control processor receives a request for communication with its associated node processor, it enters the node communication routine shown in FIG. 18.

Figure 14:
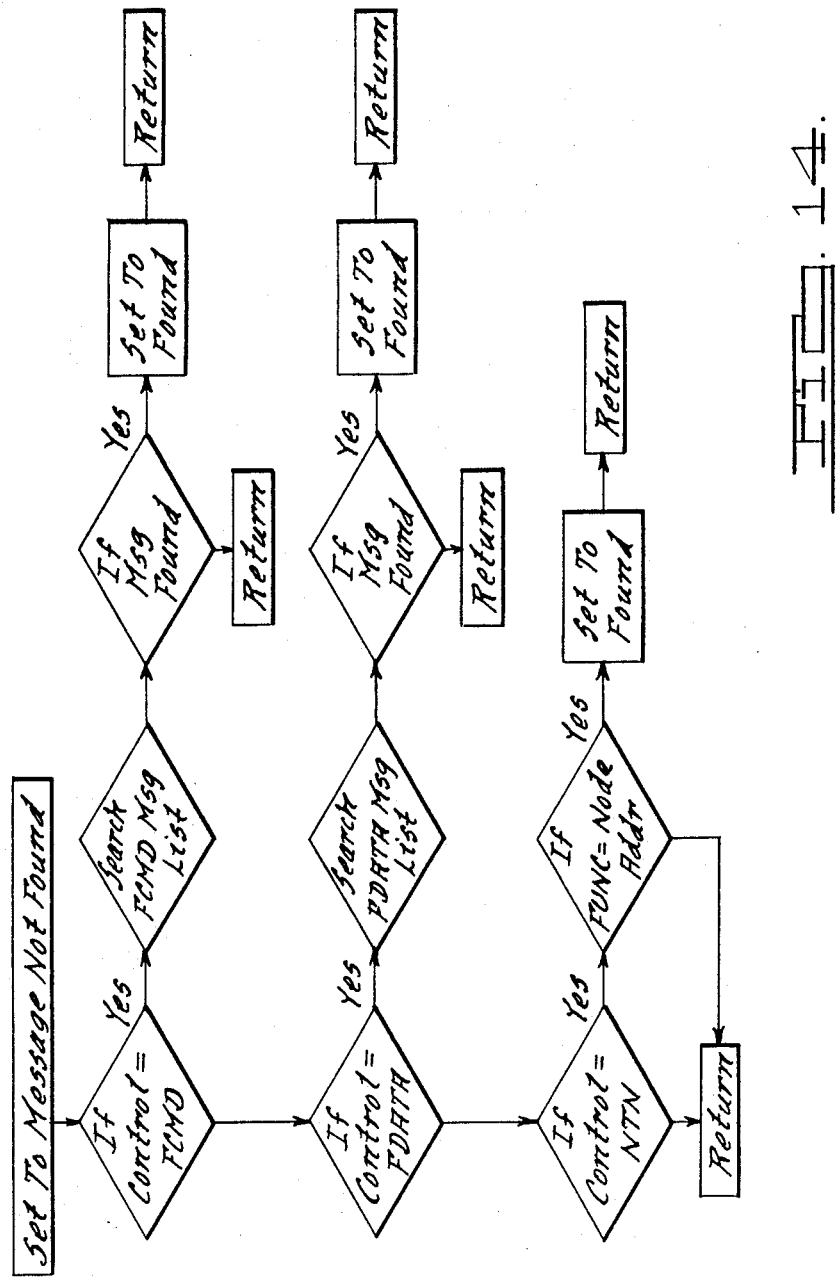
FIG. 14 is a flow diagram of a control processor receive message lookup routine.
Figure 15:
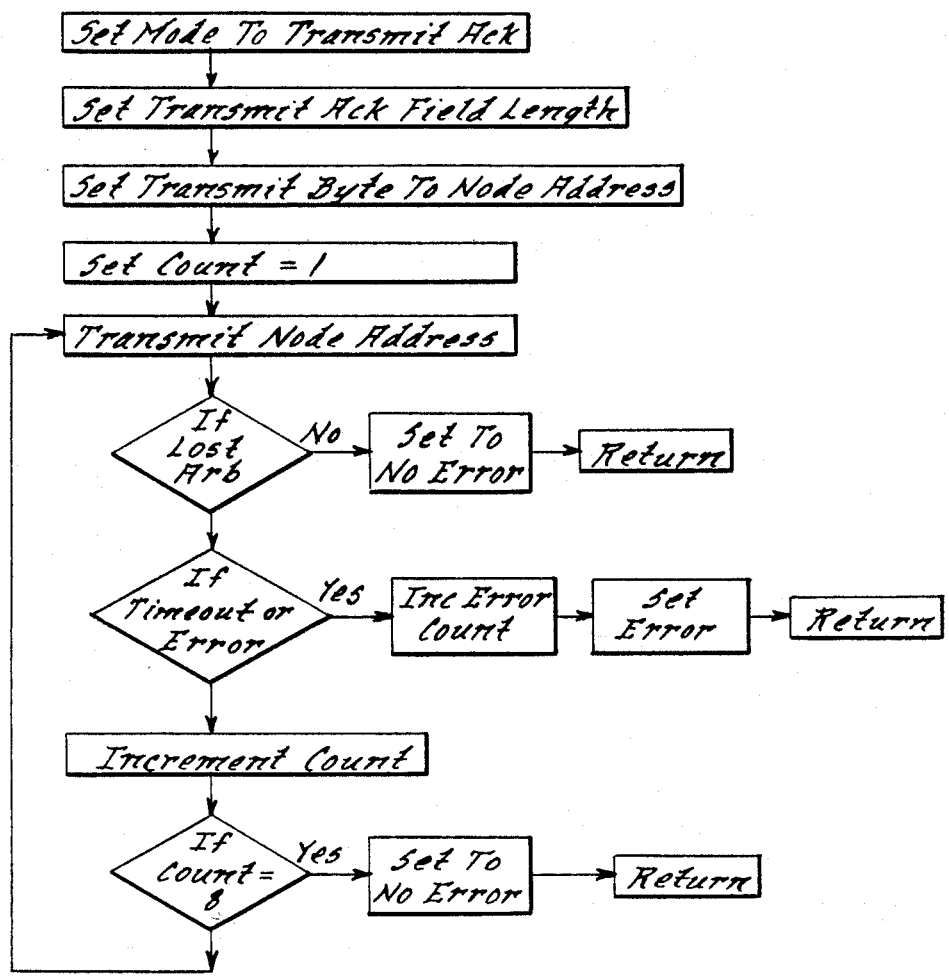
FIG. 15 is a flow diagram of a control processor transmit acknowledgment routine.

In the receive message routine, a receive message look up subroutine is entered after the generic function field is received and stored in an appropriate register location. The receive message look up routine is shown in FIG. 14 wherein the control field identifies either a function command (FCMD) type signal, a function data transfer (FDATA) type signal or a node-to-node (NTN) type signal is stored in the next field and compares the contents of that field received with the appropriate message type register in order to determine if the message being received is one which the corresponding control module should receive. If the message is deemed as not appropriate, the module returns to its idle state. On the other hand, if the message is found in the appropriate register and the checksum field is verified, an acknowlegment is made and the routine then notifies the associated node processor it has received a message and will transfer the same. In the transmit acknowledgment routine shown in FIG. 15, the receiving control module provides its own unique "node" address in the appropriate acknowledgment field. However, if arbitration is lost it will continue to attempt access and transmit its node address for a predetermined number of times before giving up.

Figure 16A:
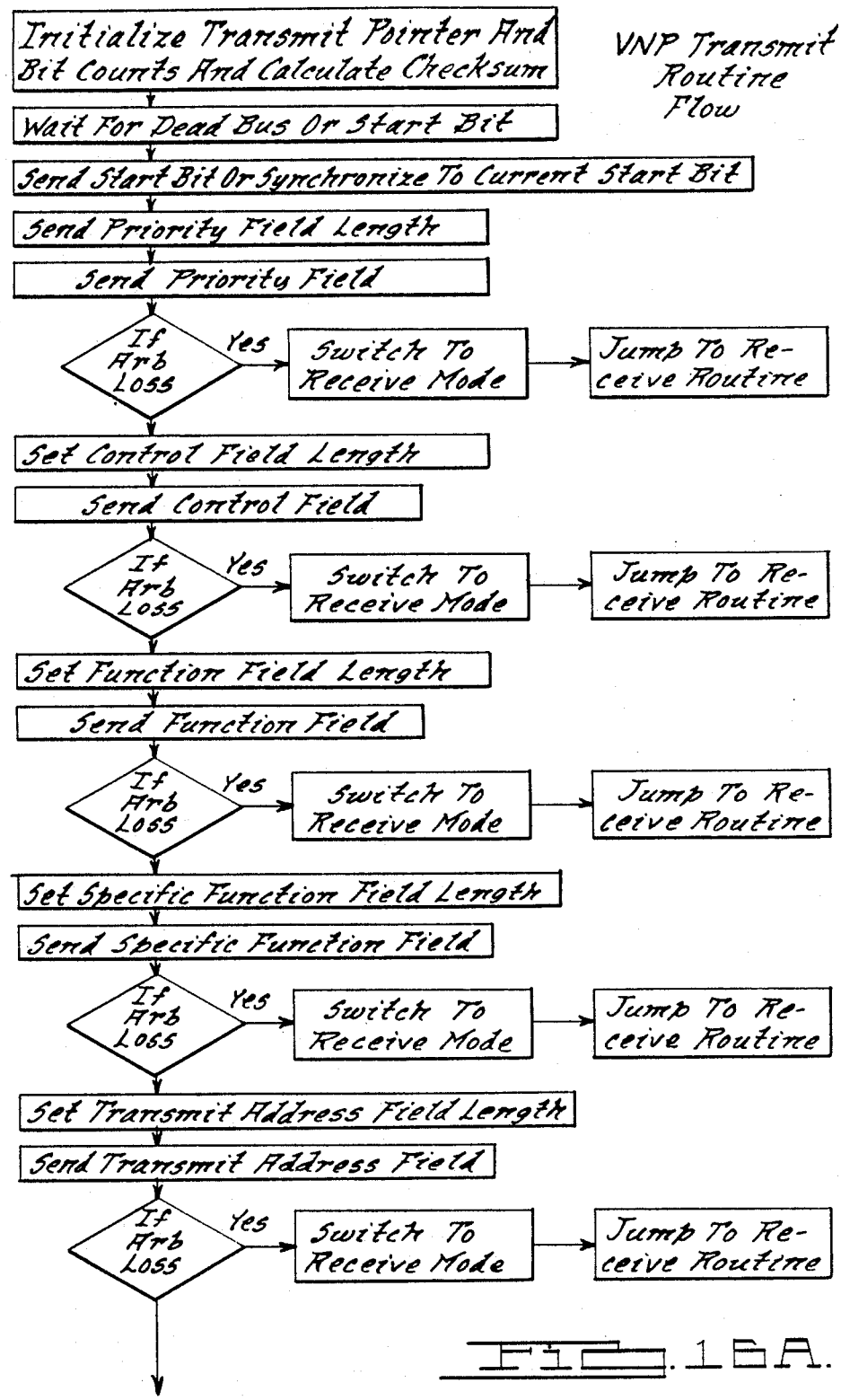
FIGS. 16A and 16B provide a flow diagram of a control processor message transmit routine.
Figure 16B:
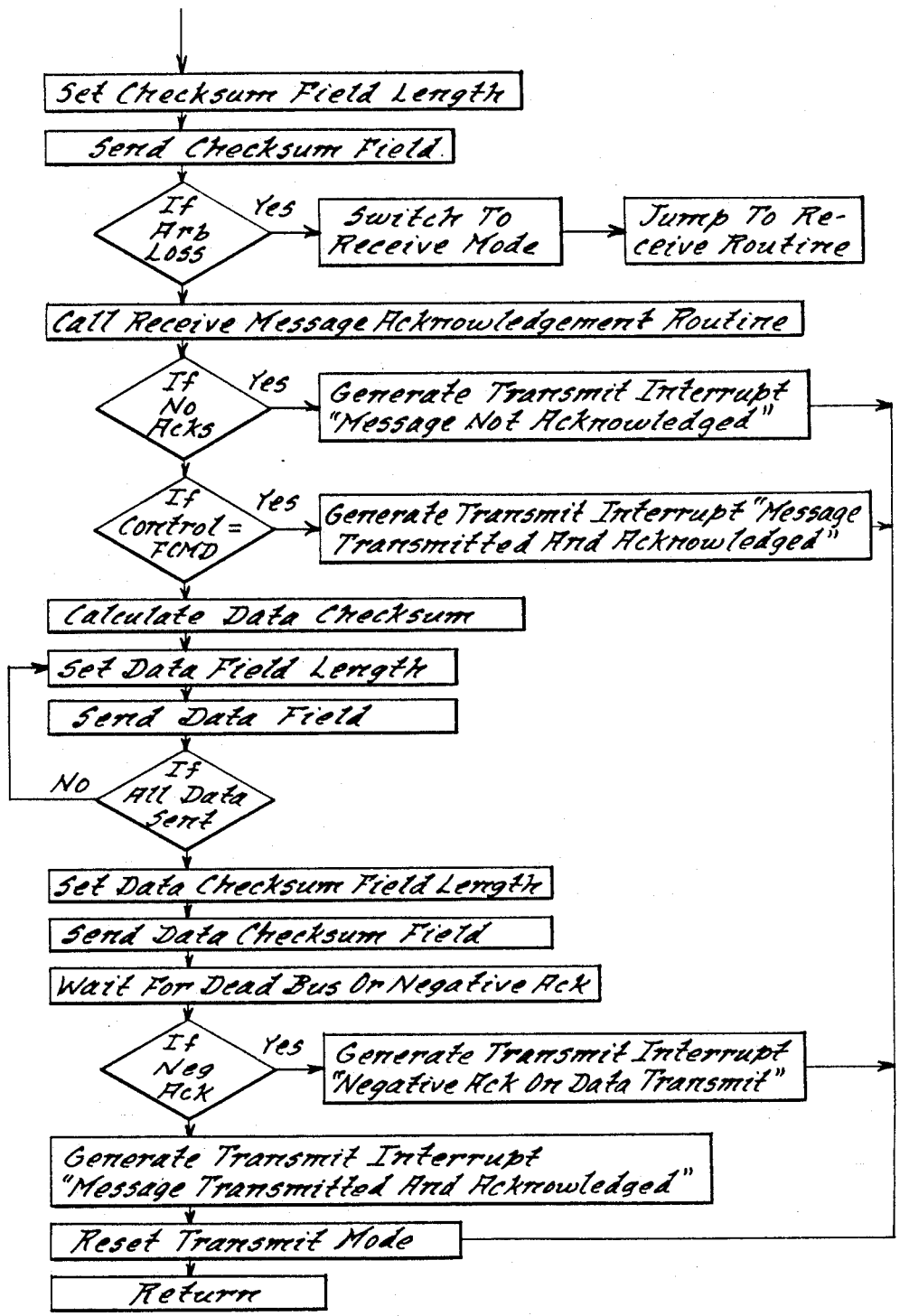

In the transmit routine shown in FIGS. 16A and 16B, the control module waits for a inactive bus for at least one bit cell period in order to transmit its start bit signal or the occurrence of a start bit signal from another source. In the event a start bit is detected, the control module synchronizes its current start bit and gets set to send its priority signal in the field following the start bit. If arbitration is lost during the priority field, the losing transmitter inhibits further transmission of its message and switches to a receive mode in order to receive the priority message being sent by another control module. If arbitration is not lost, the control module sends the control field followed by the generic function field, the specific function field and the unique address of the specific transmitting control module followed by a cumulative checksum field signal. In each case of sending the particular fields, the arbitration protocol is followed so that if a transmitting control module detects the bus being at a different logic state than that transmitted, an arbitration loss is indicated. In the event messages are not transmitted due to arbitration loss or transmitted messages are not acknowledged, the transmit mode of the control module is reset and the message is again transmitted.

It will be apparent that many modifications and variations may be implements without departing from the scope of the novel concept of this invention. Therefore, it is intended by the appended claims to cover all such modifications and variations which fall within the true spirit and scope of the invention.

We claim:

1. A data transfer communication system comprising:
   a common data bus;
   a plurality of communication control modules;
   each control module having an unique identifying address and being programmed to perform one or more predetermined functions;
   each control module being connected to said data bus and each containing means for receiving and means for transmitting data messages from or to other control modules on said common data bus;
   each control module includes means for formatting data messages for transmitting on said common data bus into one of at least two types of messages each of which includes in sequence, a common but unique START signal of a predetermined field length to indicate the start of a data message transmission, a PRIORITY signal of a second predetermined field length to indicate the code of the relative degree of priority the formatted data message has for transmission on a predetermined hierarchy of priority, a TYPE CONTROL signal of a third predetermined field length to indicate the code of which one of said at least two types of data messages is being formatted for transmission, a FUNCTION or RECEIVER ADDRESS signal of a fourth predetermined field length indicating the code of the function to be performed by other control modules connected to said data bus or the unique identifying address of a specific control module intended to received the data message; and
   each control module further contains means for storing its unique identifying address and function codes of the specific predetermined functions it is programmed to control.

2. The system as in claim 1, wherein each control module also includes means for transmitting the formatted message on said data bus with binary bit signals having a predetermined bit-time period, wherein each binary bit signal is subdivided into at least three predetermined subbit-time periods which, when summed, equal said bit-time period; and said transmitting means provides said binary bit signals to said data bus with one of said binary bits being distinguishably dominant over the other in the event two opposing binary bit signals are being transmitted on said data bus at the same time by different control modules.

3. A system as in claim 1, wherein said formatting means formats said data messages into at least either a "function command" type data message identified by a first predetermined TYPE control signal whereby any other control module having a stored function code which corresponds to the subsequently transmitted FUNCTION code will continue to receive the transmitted data message, or a "node-to-node" type data message identified by a second predetermined TYPE control signal whereby only that control module having a stored unique identifying address corresponding to the subsequently transmitted RECEIVER ADDRESS code will continue to receive the transmitted data message.

4. A system as in claim 2, wherein the system further comprises a plurality of additional control means associated with and connected to each control module for providing input signals to said control module representing functional or informational data and responding to said functional or informational output signals from said control module; and
   wherein each control module includes means for receiving and recognizing each START signal transmitted on the data bus, for receiving and recognizing the PRIORITY signal, for receiving and recognizing the TYPE CONTROL signal and receiving and recognizing the FUNCTION or RECEIVER ADDRESS signal,
   means responsive to said TYPE CONTROL signal for comparing the received FUNCTION signal with the stored function codes or comparing the RECEIVER ADDRESS signal with the stored unique address code, and
   means for formatting and transmitting the unique address on said data bus when said comparing means indicates an identity.

5. A method of transmitting data communication on a common data bus between recipients comprising the steps of:
   providing a binary bit signal format having a first of two binary bit signals defined as having a predetermined bit-time duration and each bit-time duration being subdivided into at least three predetermined subbit-time periods, a first of said binary bit signals being represented by an energization of said data bus to at least a minimum predetermined level during the first subbit-time period followed by deenergization of said data bus for the remaining two subbit-time periods of said bit-time duration and a second of said binary bit signals being represented by an energization of said data bus to at least said predetermined level during the first two subbit-time periods followed by a deenergization of said data bus for the remaining subbit-time period of said bit-time duration and a unique START bit signal represented by the energization of said data bus to a least said predetermined level for five subbit-time periods followed by one subbit-time period of deenergization;

providing a data transmission format utilizing said binary bit signals and said START bit signal to include in sequence a START bit signal to indicate the start of a data message transmission, a PRIORITY signal of a predetermined binary bit field length to indicate the code of the relative degree of priority the formatted data message has for transmission in a predetermined hierarchy of priority, a TYPE CONTROL signal of a predetermined bit field length to indicate the code of at least two types of data messages being transmitted, a FUNCTION or RECEIVER ADDRESS signal of a predetermined bit field length respectively indicating the code of the function to be performed by a recipient of the first type of message or the unique address of a specific recipient of the second type of message, wherein said TYPE CONTROL is provided to define a first message type that is intended for one or more recipients connected to the common data bus and that the following signal field bears a functional instruction, followed by a variable acknowledgment period, or a second type of message intended for a specific recipient connected to the data bus and that the follwing signal field bears a unique address of said specific recipient followed, by a predetermined acknowledgment period;

providing a plurality of control modules as recipients connected to said data bus each having specific predetermined function codes and a unique address stored therein and having switchable transmitter and receiver mnodes or operation;

supplying a control module with a data message;

assembling, within said supplied control module, said message according to said data transmission format type;

serially energizing and deenergizing said data bus according to said data transmission and binary bit signal formats comparing each bit transmitted by said supplied control module with the bit signal present on said data bus and inhibiting further transmission when said comparison indicates an inequality.

6. A method as in claim 5, further including the steps of:

monitoring the data bus at each control module;

recognizing a START bit signal or said data bus;

receiving and storing the PRIORITY signal;

comparing the TYPE CONTROL along with the FUNCTION or RECEIVER ADDRESS signal with respective stored function codes or unique address;

switching each control moduel, which registers an identity in its step of comparing, to its transmitting mode of operation and transmitting its unique address on said data bus as an acknowledgment signal.

* * * * *